United States Patent Office 2,757,157
Patented July 31, 1956

2,757,157

ESTERS OF PENTANEDIOLS AND THEIR USE AS PLASTICIZERS FOR VINYL-TYPE POLYMERS

Stanford J. Hetzel, Cheltenham, Pa., assignor to Sun Oil Company, Philadelphia, Pa., a corporation of New Jersey No Drawing. Application September 7, 1950,
Serial No. 183,623

11 Claims. (Cl. 260—31.6)

This invention relates to a new class of organic compounds and to their use as plasticizers for polymeric material. More particularly, the invention relates to diesters of pentanediols and to their use as plasticizers for vinyl-type polymers.

Specifically, the invention provides novel diesters of 1,5-pentanediols and organic acids of the group consisting of aliphatic monocarboxylic acids containing at least 6 carbon atoms and aromatic monocarboxylic acids wherein the carboxyl group is attached to the aromatic ring. The invention further provides vinyl-type polymers, particularly the vinyl halide polymers, plasticized with the above-described diesters.

Vinyl-type polymers, such as the vinyl halide polymers, may be utilized for many applications in industry due to their wide range of properties. The polymers find application in the production of coating compositions, fibers, films, shaped articles and the like. These polymers are usually difficult to process and are quite brittle, however, and before they can be utilized in many of their applications it is necessary to add thereto some type of plasticizing agent. The compound selected should be compatible with the polymer in amount sufficient to impart the desired processing properties to the compounded resin, the plasticized composition should possess satisfactory strength and flexibility over a wide range of conditions, the plasticized material should be able to withstand long periods of exposure, particularly to high temperatures, without loss of plasticizer, and the addition of the plasticizer should not adversely affect the odor, color and inflammability of the finished product.

There have been many compounds suggested as plasticizer for the vinyl-type polymers in various patents and in the literature, but the results obtained by the use of these suggested compounds have not been entirely satisfactory. The addition of these plasticizers usually imparts some degree of flexibility and processability to the polymers but in many cases the resulting compositions lack many of the more desired properties which are of considerable importance when the polymers are utilized for their various industrial applications. The flexibility imparted by the addition of many of the suggested compounds, for example exists only under normal conditions and when the temperature of the material is lowered, as by the application of cold water, etc. the material becomes quite brittle and is easily cracked. In addition, many of the suggested compounds have a high degree of volatility from these polymers and after the plasticized composition has been exposed to relatively high temperatures for extended periods of time the plasticizer is lost therefrom through volatilization and the composition begins to shrink and disintegrate.

It is an object of the invention, therefore, to provide a new class of plasticizers for the vinyl-type polymers. It is a further object to provide plasticized vinyl-type polymers which possess good low temperature flexibility. It is a further object to provide plasticized vinyl-type polymers which are able to withstand extended periods of exposure to high temperatures without undergoing disintegration. It is a further object to provide improved plasticized compositions containing the vinyl halide polymers. It is a further object to provide a new class of organic compounds. It is a further object to provide novel organic compounds which possess many unexpected and beneficial properties. Other objects and advantages of the invention will be apparent from the following detailed description thereof.

It has now been discovered that these and other objects may be accomplished by the diesters of 1,5-pentanediols and organic acids of the group consisting of aliphatic monocarboxylic acids containing at least 6 carbon atoms and aromatic monocarboxylic acids wherein the carboxyl group is attached to the aromatic ring. These novel esters have proved to be superior plasticizers for the vinyl-type polymers as they are highly compatible therewith and yield plasticized compositions having excellent tensile strength and flexibility over a wide range of conditions, as hereinafter fully described. In addition, these esters have proved to have a relatively low degree of volatility from the vinyl-type polymers and the plasticized compositions are able to withstand long periods of exposure to air and/or relatively high temperatures without shrinking and undergoing any deterioration.

The pentanediols utilized in producing the novel esters of the invention are those diols possessing a straight chain of 5 carbon atoms to which both of the hydroxyl groups are attached, one of the hydroxyl groups being attached to the number one chain carbon atom and the second hydroxyl group being attached to the number five chain carbon atom. The hydrogen atoms attached to the chain carbon atoms of the above-described pentanediol molecule may be replaced if desired by other non-interfering substituents, such as alkyl radicals, alkoxy radicals, and the like. Examples of the pentane diols are 1,5-pentanediol, 3,4-dimethyl-1,5-pentanediol, 2,4-dimethyl-2-methoxymethyl-1,5-pentanediol, 2-ethyl - 1,5 - pentanediol, 3-methoxy-2-methyl-1,5-pentanediol, and the like. 1,5-pentanediol is the more preferred diol to be used in producing the novel esters.

The above-described 1,5-pentanediols may be produced by any suitable method. 1,5-pentanediol may be prepared for example, by hydrolyzing dihydropyran-1,4 and hydrogenating the resulting product in the presence of a copper-chromite hydrogenation catalyst. A detailed description of this method of preparation may be found in "Journal of American Chemical Society," volume 68, page 1646 (1946). Other methods may be employed.

The acids that may be utilized in the preparation of the novel esters of the invention are the organic acids of the group consisting of aliphatic monocarboxylic acids containing at least 6 carbon atoms and aromatic monocarboxylic acids wherein the carboxyl group is attached to the aromatic ring. The aliphatic monocarboxylic acids may be saturated or unsaturated and may be further substituted with non-interfering substituents, such as halogen atoms, alkoxy radicals and the like. Examples of the aliphatic monocarboxylic acids are caproic acid, enanthic acid, caprylic acid, pelargonic acid, capric acid, hendecanoic acid, lauric acid, myristic acid, pentadecanoic acid, palmitic acid, stearic acid and arachidic acid. The aromatic monocarboxylic acids may be mononuclear or polynuclear and may be substituted with non-interfering substituents, such as alkyl radicals, halogen atoms and the like. Examples of the aromatic monocarboxylic acids are benzoic acid, naphthoic acid, anthroic acid, the toluic acids and ethyl benzoic acid.

Preferred acids to be utilized in the preparation of the novel esters are the organic acids of the group consisting of the open-chain monocarboxylic acids containing at least 6 carbon atoms and having a straight chain of at least 6 carbon atoms attached directly to the carboxyl group, and mononuclear aromatic monocarboxylic acids having the carboxyl group attached directly to the aromatic ring. Examples of these preferred acids are caproic acid, enanthic acid, caprylic acid, pelargonic acid, benzoic acid and the toluic acids.

Particularly preferred acids to be utilized in the preparation of the esters are the open-chain monocarboxylic acids containing from 6 to 18 carbon atoms and having a straight chain of at least 6 carbon atoms attached to the carboxyl group, such as caproic acid, caprylic acid, and pelargonic acid, and the mononuclear aromatic acids such as benzoic acid, o-toluic acid, m-toluic acid, p-toluic acid, and mixtures of the various toluic acids.

The novel esters of the invention may be obtained by esterifying the above-described 1,5-pentanediols with one or a mixture of two or more of the above-described monocarboxylic acids. Examples of the novel 1,5-pentanediol esters are 1,5-pentanediol dicaprylate, 1,5-pentanediol dipelargonate, 1,5-pentanediol dicaprate, 1,5-pentanediol dilaurate, 1,5-pentanediol dibenzoate, 2-methyl - 1,5 - pentanediol dienanthate, 3 - methyl - 1,5 - pentanediol didecanoate, 3 - chloro - 1,5 - pentanediol di - caprate, 1,5-pentanediol distearate, 1,5-pentanediol di-dodecadienoate, the 1,5-pentanediol ditoluates, 1,5-pentanediol caprylate caprate, and 2,3-diethyl-1, 5-pentanediol dicaprate.

Examples of the preferred esters, i. e. those produced from 1,5-pentanediol and the preferred group of acids described above are 1,5-pentanediol dicaproate, 1,5-pentanediol dienanthate, 1,5-pentanediol dicaprylate, 1,5-pentanediol dipelargonate, 1,5-pentanediol dibenzoate, and 1,5-pentanediol ditoluate.

The above-described esters may be prepared by any suitable method. They may be prepared, for example, by direct esterification of the above-described acids and diols in the presence of an esterification catalyst, by reacting the alcohol with an acid chloride in pyridine or by an ester exchange reaction wherein esters of pentanediol and/or esters of the monocarboxylic acids are reacted in the presence of an ester exchange catalyst.

It is usually preferred, however, to prepare the esters by direct esterification. According to this method the acids and pentanediols are heated together and the water formed during the reaction is removed, preferably by distillation. Catalysts may be used in the direct esterification process if desired. Such catalysts may be exemplified by p-toluenesulfonic acid, ethylsulfonic acid, hydrobromic acid, chloroacetic acid, sulfuric acid, benzenesulfonic acid, formic acid, boron and silicon fluorides, acid salts, such as mono-sodium and mono-potassium sulfates, and salts of strong acids and weak bases, such as aluminum sulfate, zinc chloride, zinc sulfate and the like. The amount of the catalyst employed will vary over a wide range depending upon the particular type of reactants, catalysts, and reaction conditions employed. In most cases, the amount of catalyst will vary between 0.1% to 5% by weight of reactants. Preferred amounts of catalyst to be employed in the esterification process varies between 0.5% to 2% by weight of reactants.

The amount of the acids and pentanediols to be utilized in the esterification reaction may vary over a considerable range. As both of the hydroxyl groups of the pentanediol molecule are to be esterified it is preferred to add the acid in excess of a double molar quantity. In general, the acid and diol will be utilized in approximately stoichiometric quantities, but the molar ratios varying from 2:1 to 2.5:1, respectively, may be employed.

The esterification may be accomplished in the presence or absence of solvents or diluents. In case the solvents or diluents are desired, inert organic compounds, such as benzene, toluene, cyclohexanone, and xylene, which do not interfere with the reaction may be used.

The temperature employed during the esterification may vary over a considerable range depending upon the type of reactants and catalysts to be employed. In most cases the temperature will range between about 40° C. to 250° C. with a preferred range being between 60° C. and 150° C. Higher or lower temperatures may be employed if desired or necessary.

In some cases it may be desirable to conduct the reaction in an inert atmosphere, such as nitrogen, but such a precaution is not essential. Atmospheric, superatmospheric or subatmospheric pressures may be used.

The separation of the esters formed in the reaction may be accomplished by any suitable means, such as extraction, distillation, fractional precipitation and the like.

The preparation and some of the properties of the novel esters of the invention are illustrated by the following examples. It should be understood, however, that the examples are for the purpose of illustration and they are not to be regarded as limiting the invention in any way.

*Example I*

99 grams of pelargonic acid were heated under refluxing conditions with 26 grams of 1,5-pentanediol and 150 cc. of xylene for 6 hours. 5 grams of paratoluene sulfonic acid were used as a catalyst. Water from the esterification was removed continuously in a Dean-Stark tube. The reaction product was washed with a 20% solution of sodium carbonate and dried over anhydrous calcium chloride. Xylene was removed and the remainder of the reaction mass was distilled taking three cuts as follows:

Grams
Cut #1—boiling up to 210° C./2–5 mm. Hg (unreacted 1,5-pentanediol and half ester) ------------ 8
Cut #2—210° C.–222° C./2–5 mm. Hg (product of the invention) ------------------------------ 83
Cut #3—boiling above 222° C./2–5 mm. Hg (polymeric material-residue) ------------------------ 7

*Example II*

180 grams of caprylic acid (1.25 moles) were heated under refluxing conditions with 52 grams 1,5-pentanediol (0.5 mole) and 250 cc. xylene for 8 hours. Two grams paratoluene sulfonic acid were used as a catalyst. Water from the esterification was removed continuously in a Dean-Stark tube. The reaction product was washed with a 20% solution of sodium carbonate and dried over anhydrous calcium chloride. Xylene was removed and the remainder of the reaction mass was distilled taking three cuts as follows:

Grams
Cut #1—boiling up to 220° C./5 mm. Hg (unreacted 1,5-pentanediol and half ester) ------------ 87
Cut #2—220° C.–222° C./5 mm. Hg (product of the invention) ------------------------------ 86
Cut #3—boiling up to 222° C./5 mm. Hg (polymeric material-residue) -------------------------- 15

The product of this invention is a colorless to pale amber oil-like material having a boiling point at 5 mm. Hg of about 220° C.–222° C., a refractive index $N_D^{20°C.}$ 1.4454, a density $d_4^{20°C.}$ 0.9246 and a melting point of about minus 8° C.

*Example III*

Following the procedure of Example I, 1,5-pentanediol esters of caproic, enanthate and caprylic acids were prepared. Properties of the esters, including the products of Examples I and II, are given in the following table.

| 1,5-Pentanediol Ester | Boiling Point, ° C. | Refractive Index $N_D^{20°C.}$ | Density $d_4^{20°C.}$ | Melting Point, ° C. |
|---|---|---|---|---|
| Dicaproate | 165–175/2 mm. Hg | 1.4394 | 0.9149 | |
| Dienanthate | 177–178/2 mm. Hg | 1.4423 | 0.9327 | |
| Dicaprylate | 220–222/5 mm. Hg | 1.4454 | 0.9246 | −8 |
| Dipelargonate | 210–222/2–5 mm. Hg | 1.4467 | | −12 |

Example IV 488 grams of benzoic acid (4 moles) were heated under refluxing conditions with 208 grams (2 moles) of 1,5-pentanediol and 500 cc. xylene for 24 hours. Five grams para-toluene sulfonic acid were used as a catalyst. Water from the esterification was removed continuously in a Dean-Stark tube. The reaction product was washed with 20% aqueous solution of sodium carbonate and dried over anhydrous calcium chloride. Xylene was removed and the remainder of the reaction mass was distilled taking four cuts as follows:

| | Grams |
|---|---|
| Cut #1—boiling below 200° C./7 mm. Hg (unreacted 1,5-pentanediol) | 110 |
| Cut #2—200° C.-240° C./5 mm. Hg (probably half-ester) | 76 |
| Cut #3—240° C.-241° C./5 mm. Hg (product of the invention) | 281 |
| Cut #4—boiling above 241° C./5 mm. Hg (polymeric material remaining as residue) | 78 |

The product of this invention is a colorless to pale amber oil-like material having a boiling point at 5 mm. Hg of about 240° C., a refractive index $N_D^{20°\ C.}$ 1.5414, a density $d_4^{20°\ C.}$ 1.123 and a melting point of about 22° C.-23° C. It will be noted that the temperature (20° C.) at which the refractive index and density were obtained is below the melting point of the product. This is due to the fact that the product is easily obtained and maintained in a supercooled condition.

Example V

Homologs of benzoic acid may be employed in place of the benzoic acid of Example IV. Metatoluic acid and 3,5-dimethyl benzoic acid, for example, have been employed with good results.

Mixtures of 1,5-pentanediol diesters of homologs of benzoic acid may be conveniently prepared by esterifying the acidic products obtained by liquid phase catalytic air oxidation of the aromatic constituents of a petroleum hydrocarbon fraction boiling substantially through the range 300–400° F. The aromatics normally present in such a petroleum fraction are: ortho-xylene, meta-xylene, para-xylene, ethylbenzene, m-ethyltoluene, o-ethyltoluene, propylbenzene, cumene, mesitylene, pseudocumene, hemimellitene and $C_{10}$ aromatics. Prior to oxidation, these aromatics may be separated from the petroleum fraction by any known means, for example by the silica gel adsorption-desorption technique as described in U. S. Patent No. 2,398,101. By oxidation of such aromatic mixtures there is obtained a mixture of monocyclic aromatic carboxylic acids including toluic acids and higher homologs.

The above-described esters of the 1,5-pentanediols possess many unexpected properties which enable them to be utilized for many important industrial applications. They may be utilized, for example, as solvents, stabilizers, textile lubricants, lubricating oil additives, asphalt adhesive agents, water-proofing agents for silica gel greases, additives for insecticides and germicides. The esters are particularly valuable, however, as plasticizers for the vinyl-type resins. When utilized in this capacity, they form compounded resins having many superior properties described above.

The vinyl-type polymers which may be plasticized by the novel esters of the invention are the homopolymers, copolymers and interpolymers of the vinyl-type monomers. The vinyl-type monomers include all those organic compounds containing at least one $CH_2=C<$ group in their molecule. Examples of the vinyl-type monomers are styrene, alpha-methylstyrene, dichlorostyrene, vinyl naphthalene, vinyl phenol, acrylic acid, and the alpha-alkyl substituted acrylic acids; the esters of these unsaturated acids, such as methyl acrylate, methyl methacrylate, butyl methacrylate and propyl acrylate; the vinylidene halides, such vinylidene chloride, vinylidene bromide and vinylidene fluoride, the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate, the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether, and the vinyl ketones, such as vinyl butyl ketone, and vinyl ethyl ketone. Other vinyl-type polymers may also be plasticized by the esters of the present invention, such as the resins obtained as the result of reaction between polyvinyl alcohol and aldehydes. Polyvinyl formal, polyvinyl acetal and polyvinyl butyral resins are illustrative of this latter group of resins.

Preferred vinyl-type resins to be plasticized with the novel esters of the invention are polyvinyl chloride, polyvinyl formal, polyvinyl acetal and polyvinyl butyral.

The polymers, copolymers and interpolymers to be plasticized with the esters of the 1,5-pentanediols may be prepared by any of the usual polymerization methods. Such methods include heating the monomeric material in the liquid or vapor phase or in a solvent, or in an emulsion with an immiscible liquid, with a catalyst, such as a peroxide catalyst, a per-acid catalyst, a per-salt catalyst, or an aromatic perester catalyst. The usual method for preparing the polymers comprises heating the monomer in an aqueous emulsion in the presence of an emulsifying agent and polymerization catalyst.

A single ester may be used as the plasticizer or a mixture of two or more of the compounds may be utilized. In addition, the esters of the 1,5-pentanediols may be used as plasticizers in combination with known plasticizers, such as dioctyl phthalate, dibutyl phthalate, tricresyl phosphate and the like.

The amount of the ester of the 1,5-pentanediols to be incorporated with the above-described vinyl-type polymers may vary over a considerable range depending upon the particular type of polymer to be utilized, the intended use of the compounded resins, etc. In most cases, the amount of the plasticizer will vary from about 20 to 150 parts by weight for every 100 parts by weight of resin. A more preferred range of plasticizer to be utilized comprises 40 parts to 75 parts by weight of plasticizer for every 100 parts by weight of resin. It has been observed, however, that with increasing molecular weight of the acids used in preparing the ester, a smaller quantity thereof should be employed in order to insure complete compatibility. Where the acid employed in the preparation of the ester has less than 10 carbon atoms, complete compatibility is observed in all proportions of ester to polymer, and hence it is preferred to employ diesters wherein both acid groups have from 6 to 9 carbon atoms. For example, when about 68 parts by weight of 1,5-pentanediol dicaprate is milled with 100 parts by weight of polyvinyl chloride, complete compatibility is not observed, since on standing the ester tends to exude from the plasticized composition. Esters of higher acids, such as lauric and myristic acids, are even more incompatible. Of course, smaller quantities of these esters may be compatible with polyvinyl chloride, as may plasticized compositions prepared from such esters and other vinyl-type resins.

Fillers and pigments such as whiting, channel black, clay, gum rosin, silica and others, and stabilizers, such as litharge, other lead compounds, some oxides of the bismuth and barium types and some silicates may also be added to the polymers along with the novel esters of the invention.

The vinyl-type resin compositions may be compounded by means of conventional equipment such as mills of the heated roll type or internal mixers. The plasticizer and other compounding ingredients, such as fillers and stabilizers, are worked into the vinyl resin so that they are thoroughly dispersed therein by means of such equipment, and the resultant composition then molded, calendered, extruded or otherwise formed into articles of the desired shape by conventional procedure.

The following examples illustrate the use of the novel esters of the invention as plasticizers for the vinyl resins. It should be noted, however, that the examples are for the purpose illustration and they are not to be regarded as limiting the invention in any way.

*Example VI*

A commercial polyvinyl resin (76.05 grams), known as Geon 101 and composed mainly or wholly of polyvinyl chloride, was mixed together with lead carbonate (1.24 grams) and stearic acid (0.59 gram) in the dry state by ball milling. 52 grams of the 1,5-pentanediol dibenzoate, prepared as described in Example IV, were added in a cake mixer and the mass stirred thoroughly until good mixing was obtained. This mass was then fused on a 3″ x 8″ rubber mill the rolls of which were maintained at a temperature of about 285° F. The banded material was cut several times from each side and sheeted off at about 0.030 inch to give a rough sheet of about 0.070 inch when cooled. Part of this sheet was remilled to give a thin sheet of about 0.010 inch. Milling times were about 6 minutes and 2 minutes respectively. The thin sheet (0.010″) furnished material for volatility and water extraction tests. After five minutes preheating at 160° C. the rough sheet was molded for 10 minutes at 1500 lbs./sq. in. in a 5¾″ square steel mold to give a smooth sheet about 0.045″ thick. This sheet (0.045″) furnished material for tensile strength, modulus, elongation, brittle point, heat stability and Shore hardness tests. Test results were as follows:

Volatility (wt. loss at 100° C.—3 hrs.). 0.016%.
Water extraction (wt. loss in water after 10 days at room temperature). 0.05%.
Tensile strength (Scott-ASTM D412–41). 1675 lbs./sq. in.
Modulus at 300% elongation. 1650 lbs./sq. in.
Elongation. 305%.
Brittle point. minus 40° C.
Heat stability (time for color change at 160° C.). 7 hours.
Shore hardness. 65.

*Example VII*

The procedure of Example VI was duplicated except that 1,5-pentanediol dicaprylate, prepared as described in Example III, was employed in place of the dibenzoate ester.

A plasticized product having the following properties was obtained:

Volatility (wt. loss at 100° C.—3 hrs.). .24%.
Water extraction (wt. loss in water after 10 days at room temperature). .18%.
Tensile strength (Scott-ASTM D412–41). 1730 lbs./sq. in.
Modulus at 300% elongation. 1400 lbs./sq. in.
Elongation. 395%.
Brittle point. −77° F.
Heat stability (time for color change at 160° C.). 4 hours.
Shore hardness. 56.

*Example VIII*

The esters prepared in accordance with Examples I, II and III were used to prepare a plasticized product following the procedure of Example VI. The products had the following properties:

| Properties of Plasticized Composition | Dicaproate | Dienanthate | Dicaprylate | Dipelargonate |
|---|---|---|---|---|
| Volatility (percent wt. loss at 100° C.—3 hrs.) | 1.01 | | 0.24 | 0.96 |
| Water extraction (percent wt. loss in water after 10 days at room temperature) | 0.59 | 0.42 | 0.18 | 0.5 |
| Tensile strength in lb./sq. in. (Scott ASTM D412–41) | 1,425 | 1,600 | 1,730 | 1,235 |
| Modulus in lb./sq. in. at 300% elongation | 1,050 | 1,210 | 1,400 | |
| Elongation in percent | 420 | 420 | 395 | 230 |
| Brittle point in °F | −65 | −80 | −77 | −75 |
| Heat stability in hrs. (time for color change at 160° C.) | 7 | 2 | 4 | 12 |
| Shore hardness | 57 | 55 | 56 | 55 |

*Example IX*

80 parts by weight of a resin, known commercially as Vinylite AYAF and consisting essentially of polyvinyl acetate, were fused on a 3″ x 8″ rubber mill whose rolls were heated to 220–230° F. About 20 parts of 1,5-pentanediol dibenzoate as plasticizer and about 1 part of magnesium stearate as lubricant were added to the fused resin. The resin and ester blended to form a homogeneous mixture. The mixture was sheeted off at 175–190° F. to give a plastic sheet having satisfactory tensile strength, odor, and appearance, and flexibility substantially increased over that of the unplasticized resin.

*Example X*

50 parts by weight of a polyvinyl formal resin known commercially as Formvar 15/95 S were mixed together with about 50 parts by weight of 1,5-pentanediol dibenzoate and about 1 part of magnesium stearate. The mixture was then fused on a 3″ x 8″ rubber mill whose rolls were heated to about 300° F. The resin and ester blended to form a homogeneous mixture. The mixture sheeted off to give a plastic sheet having increased flexibility and satisfactory tensile strength, odor, and appearance.

*Example XI*

40 parts by weight of a polyvinyl butyral resin known commercially as Vinylite XYSG were mixed together with about 60 parts by weight of 1,5-pentanediol dibenzoate and about 1 part of magnesium stearate. The mixture was then fused on a 3″ x 8″ rubber mill whose rolls were heated to about 250° F. The resin and ester blended to form a homogeneous mixture. The mixture sheeted off to give a plastic sheet having increased flexibility and satisfactory tensile strength, odor, and appearance.

*Example XII*

60 parts by weight of a resin, known commercially as Geon 101 and consisting essentially of polyvinyl chloride, were mixed together with about 1 part of lead carbonate and about 1.5 parts of stearic acid in the dry state by ball milling. To the above mixture there were added about 40 parts of a mixture of 1,5-pentanediol diesters of acids obtained by liquid phase catalytic air oxidation of the aromatic constituents of a petroleum spirits fraction boiling through the range 300–400° F. The mass was stirred thoroughly in a cake mixer until good mixing was obtained. The mass was then fused on a 3″ x 8″ rubber mill whose rolls were heated to a temperature of about 300° F. This banded material was cut several times from each side and sheeted off at about 0.060 inch. Milling time was about 10 minutes. Part of this sheet was remilled to give a thin sheet of about 0.010 inch. This thin sheet furnished material for volatility and water extraction tests. After 5 minutes pre-heating at 150° C., the rough sheet was molded for 5 minutes at 1500 lbs./sq. in. in a 5¾″ square steel mold to give a smooth sheet about 0.045″ thick. This sheet furnished material for brittle point, heat stability, Shore hardness, and ultraviolet stability tests. Test results were as follows:

Volatility (wt. loss at 100° C.—3 hrs.) _____ 1.9%.
Water extraction (wt. loss in water after 10 days at room temperature). 1.5%.
Brittle point _____ Minus 5° F.
Heat stability (time for color change at 160° C.). 3 hours.
Stability to ultraviolet light_____ Excellent.
Shore hardness _____ 67.

Example XIII 80 parts by weight of a resin, known commercially as Vinylite AYAF and consisting essentially of polyvinyl acetate, were fused on a 3″ x 8″ rubber mill, whose rolls were heated to 220–230° F. About 20 parts of 1,5-pentanediol dimetatoluate as plasticizer and about 1 part of magnesium stearate as lubricant were added to the fused resin. The resin and ester blended to form a homogeneous mixture. The mixture was sheeted off at 175–190° F. to give a plastic sheet having satisfactory tensile strength and appearance, and flexibility substantially increased over that of the unplasticized resin.

Example XIV 60 parts by weight of a polyvinyl butyral resin known commercially as Vinylite XYSG were mixed together with about 40 parts by weight of 1,5-pentanediol dimetatoluate as plasticizer and about 1 part of magnesium stearate as lubricant. The mixture was then fused on a 3″ x 8″ rubber mill whose rolls were heated to about 250° F. The resin and ester blended to form a homogeneous mixture. The mixture sheeted off to give a plastic sheet having satisfactory tensile strength, odor, and appearance, and flexibility substantially increased over that of the unplasticized resin.

Example XV 60 parts by weight of Geon 101 were mixed together with about 40 parts by weight of 1,5-pentanediol dimetatoluate, about 1 part of lead carbonate, and about 1.5 parts of stearic acid. The mixture was then fused on a 3″ x 8″ rubber mill whose rolls were heated to about 300° F. The resin and ester blended to form a homogeneous mixture. The mixture sheeted off to give a plastic sheet having increased flexibility and satisfactory tensile strength, odor, and appearance.

Example XVI 60 parts by weight of a polyvinyl formal resin, known commercially as Formvar 15/95 S, were mixed together with about 40 parts by weight of 1,5-pentanediol dimetatoluate and about 1 part of magnesium stearate. The mixture was then fused on a 3″ x 8″ rubber mill whose rolls were heated to about 300° F. The resin and ester blended to form a homogeneous mixture. The mixture sheeted off to give a satisfactory plastic sheet.

Example XVII 60 parts by weight of Geon 101 were mixed together with about 40 parts by weight of the 1,5-pentanediol diester of 3,5-dimethyl benzoic acid, about 1 part of lead carbonate, and about 1.5 parts of stearic acid. The mixture was then fused on a 3″ x 8″ rubber mill whose rolls were heated to about 300° F. The resin and ester blended to form a homogeneous mixture. The mixture sheeted off to give a plastic sheet having increased flexibility and satisfactory tensile strength, odor, and appearance.

This application is a continuation-in-part of the following co-pending patent applications of the instant inventor:

Serial No. 46,181, filed August 25, 1948, now abandoned which describes and claims 1,5-pentanediol dibenzoate;

Serial No. 46,184, filed August 25, 1948, now abandoned which describes and claims 1,5-pentanediol dicaprylate;

Serial No. 46,186, filed August 25, 1948, now abandoned, which describes polyvinyl chloride resin plasticized with 1,5-pentanediol dibenzoate;

Serial No. 46,189, filed August 25, 1948, now abandoned, which describes polyvinyl chloride resin plasticized with 1,5-pentanediol dicaprylate;

Serial No. 110,020, filed August 12, 1949, now abandoned, which describes polyvinyl chloride resin plasticized with 1,5-pentanediol diesters prepared from acids having from 6 to 9 carbon atoms;

Serial No. 136,141, filed December 30, 1949, now abandoned, which describes polyvinyl aldehyde and polyvinyl acetate resins plasticized with 1,5-pentanediol dibenzoate;

Serial No. 147,563, filed March 3, 1950, now abandoned, which describes polyvinyl resins plasticized with 1,5-pentanediol diesters of toluic acid and higher homologs thereof.

In patent applications Serial Nos. 46,185, filed August 25, 1948, now U. S. Patent No. 2,533,250, December 12, 1950; 46,190, filed August 25, 1948, now U. S. Patent No. 2,545,811, March 20, 1951; and 136,144, filed December 30, 1949, now U. S. Patent 2,606,171, August 5, 1952; there is described and claimed, respectively, 1,5-pentanediol diesters of acids formed by the oxidation of kerosene, polyvinyl chloride resin plasticized therewith, and polyvinyl aldehyde and polyvinyl acetate resins plasticized therewith. The scope of the present application does not include the subject matter of said applications Serial Nos. 46,185, 46,190 and 136,144, the present application being limited to the diesters of a 1,5-pentanediol with a specific acid or acids, as herein described, to vinyl-type resins plasticized therewith, and to processes for the preparation of said esters and said plasticized compositions.

In copending divisional application Serial No. 280,183, filed April 2, 1952 by the instant inventor, now abandoned, esters of 1,5-pentanediol and certain aliphatic and aromatic monocarboxylic acids are disclosed and claimed. In copending application Serial No. 321,511 filed November 19, 1952 by the instant inventor, now abandoned, vinyl polymers plasticized with 1,5-pentanediol diesters of aryl-substituted aliphatic monocarboxylic acids having 2 to 5 carbon atoms in the aliphatic portion of the molecule are disclosed and claimed. In copending application Serial No. 198,737 filed December 1, 1950 by the instant inventor, now Patent No. 2,697,045, December 14, 1954, certain cellulose derivatives plasticized with 1,5-pentanediol diesters of monocarboxylic aromatic acids are disclosed and claimed. In copending application Serial No. 252,975 filed October 24, 1951 by the instant inventor, now Patent No. 2,697,087, December 14, 1954, rubber-like butadiene-acrylonitrile copolymers plasticized with esters of 1,5-pentanediol and certain derivatives thereof and monocarboxylic acids having 5 to 20 carbon atoms inclusive are disclosed and claimed.

I claim:
1. Composition comprising polyvinyl chloride plasticized with 1,5-pentanediol dibenzoate.
2. Composition comprising polyvinyl chloride plasticized with 1,5-pentanediol ditoluate.
3. Composition comprising polyvinyl chloride plasticized with 1,5-pentanediol di(metatoluate).
4. Composition comprising polyvinyl chloride plasticized with 1,5-pentanediol dixylate.
5. Composition comprising polyvinyl chloride plasticized with 1,5-pentanediol di(3,5-dimethyl benzoate).
6. Composition comprising polyvinyl chloride plasticized with 1,5-pentanediol diesters of acids obtained by partial oxidation of aromatic petroleum fractions boiling through the range 300 to 400° F.
7. Composition comprising a vinyl polymer plasticized with a diester of 1,5-pentanediol and an aromatic mono- carboxylic acid having the carboxyl group joined directly to the aromatic ring.

8. Composition comprising a vinyl polymer plasticized with a diester of 1,5-pentanediol and a mononuclear aromatic monocarboxylic acid having the carboxyl group joined directly to the aromatic ring.

9. Composition according to claim 7 wherein said polymer is selected from the group consisting of polymer of vinyl halide, polymer of vinyl acetate, and reaction products of polyvinyl alcohol and an aldehyde.

10. Composition according to claim 7 wherein said polymer is a polymer of vinyl halide.

11. Composition according to claim 7 wherein said polymer is a polymer of vinyl chloride.

References Cited in the file of this patent

UNITED STATES PATENTS

| | | |
|---|---|---|
| 2,441,555 | Barth et al. | May 18, 1948 |
| 2,502,370 | Craver | Mar. 28, 1950 |
| 2,504,929 | Hetzel | Apr. 18, 1950 |
| 2,533,250 | Hetzel | Dec. 12, 1950 |

FOREIGN PATENTS

| | | |
|---|---|---|
| 468,533 | Great Britain | July 7, 1937 |
| 404,554 | Italy | June 18, 1943 |